United States Patent [19]

Hafeli et al.

[11] Patent Number: 4,990,043

[45] Date of Patent: Feb. 5, 1991

[54] LOCK NUT

[75] Inventors: Paul B. Hafeli, El Toro; Dennis B. Kneff, Lomita, both of Calif.

[73] Assignee: Rexnord Holdings Inc., Carson, Calif.

[21] Appl. No.: 331,271

[22] Filed: Mar. 30, 1989

[51] Int. Cl.[5] .......................................... F16B 39/284
[52] U.S. Cl. ................................. 411/280; 411/937.1
[58] Field of Search .................... 411/937, 937.1, 222, 411/280, 279, 266, 427, 437

[56] References Cited

U.S. PATENT DOCUMENTS

| | | | |
|---|---|---|---|
| 2,290,270 | 7/1942 | Brackett | 411/280 |
| 2,870,668 | 1/1959 | Flahaut | 411/937 X |
| 2,897,867 | 8/1959 | LaTorre | 411/937 X |
| 3,507,313 | 4/1970 | Stockslager | 411/937.1 X |
| 3,702,628 | 11/1972 | Casenza | 411/280 |
| 4,805,288 | 2/1989 | Cosenza et al. | |

FOREIGN PATENT DOCUMENTS

| | | | |
|---|---|---|---|
| 10396 | of 1886 | United Kingdom | 411/280 |
| 16223 | of 1910 | United Kingdom | 411/280 |
| 656348 | 8/1951 | United Kingdom | 411/266 |
| 2192249 | 1/1988 | United Kingdom | 411/280 |

OTHER PUBLICATIONS

"Kaylock Self-Locking Fasteners", *Kaynar a Microdot Company* 7/1989.

"Fasteners for Aircraft and Aerospace Applications", *Bristol Industries* 11/1986.

*Primary Examiner*—Rodney M. Lindsey
*Attorney, Agent, or Firm*—Pretty, Schroeder, Brueggemann & Clark

[57] ABSTRACT

An improved lock nut adapted for repeated use in locking onto a series of bolts, each time compressively gripping the bolt with substantially the same high compressive force. In one embodiment, the locking is achieved by a plurality of resilient locking beams that flex radially outwardly to accommodate the bolt, while in another embodiment, the locking is achieved by a generally oval-shaped sleeve that flexes into a more circular shape when the bolt is threaded into it. In both embodiments, the flexing is made to occur at multiple locations along the beam's (or sleeve's) length by providing a stepped radial thickness, such that the total amount of elastic flexing can be maximized. In another feature of the invention, usable in the embodiment that includes the multiple locking beams, the axial slots separating the beams are defined by beam side walls that diverge from each other by an amount that increases from substantially zero at the bases of the beams to a maximum at the remote tips of the beams. In yet another feature of the invention, axially-aligned recesses surround each axial slot, to space the beam edges formed by each slot from the bolt threads. This obviates the need to deburr the beam edges and minimizes the risk of galling.

6 Claims, 2 Drawing Sheets

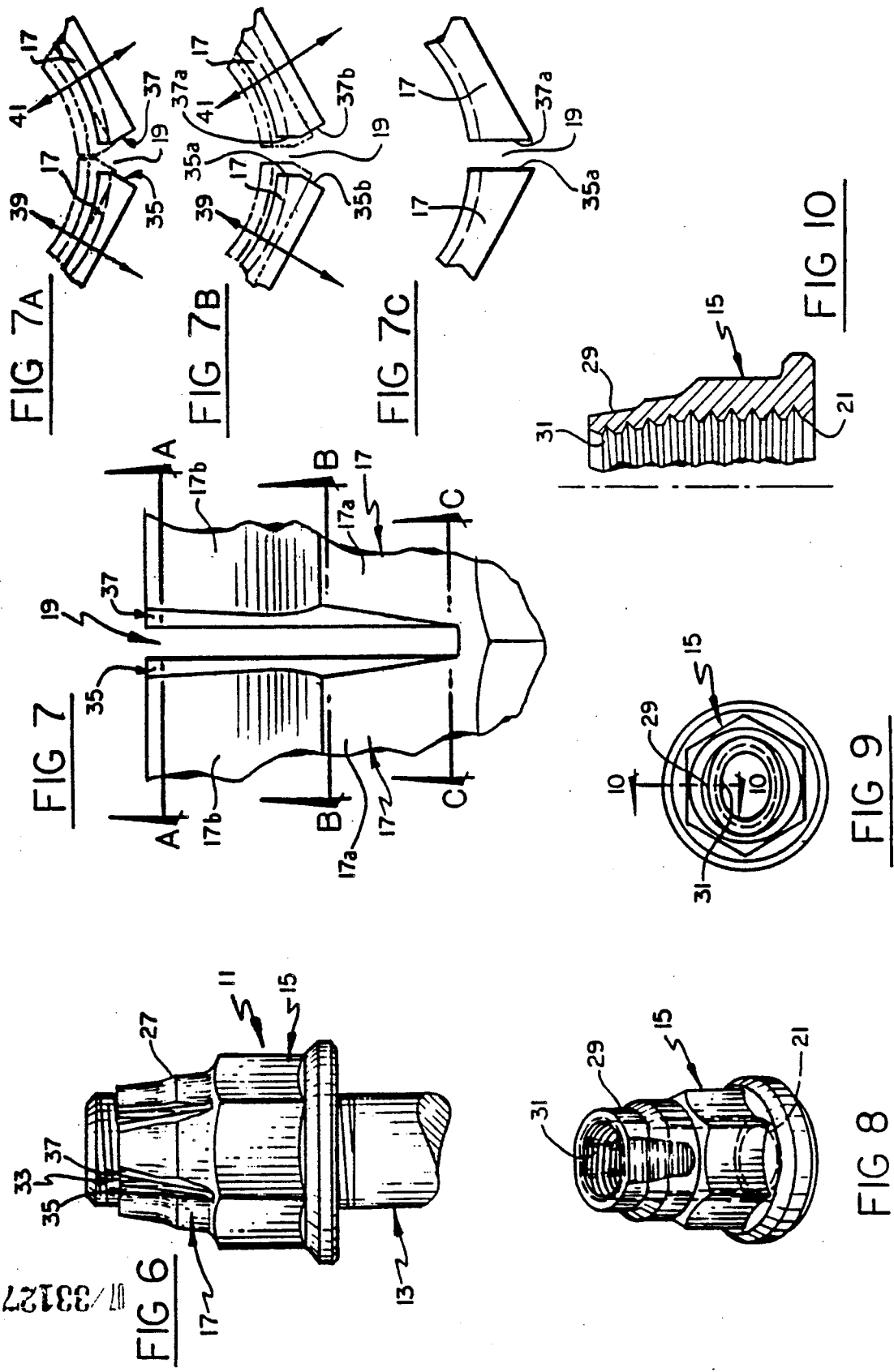

LOCK NUT

BACKGROUND OF THE INVENTION

This invention relates generally to threaded nuts adapted to lock onto bolts and, more particularly, to lock nuts that resiliently deform when bolts are threaded into them.

Lock nuts of this particular kind are disclosed in U.S. Pat. No. 4,805,288, entitled "Method For Making and Using a Locking Beam Nut." That patent discloses one-piece lock nuts of the kind that include a generally rigid body with a threaded opening extending through it and with a plurality of resilient, circumferentially-spaced locking beams projecting from one end of the rigid body. Inner surfaces of the locking beams define a threaded opening aligned with the threaded opening of the rigid body. The locking beams, which are integral with the rigid body, deviate radially inwardly such that the threaded opening they define has a uniformly-decreasing diameter When a bolt is threaded into the nut, the locking beams resiliently flex radially outwardly, to frictionally lock the bolt in place. The locking beams are separated from each other by narrow, uniform slots, and the confronting side walls of adjacent beams, which define each slot, diverge from each other with increasing radial distance. The amount of divergence is uniform along the lengths of the beams.

Lock nuts of this kind are frequently used in environments where debris can become encrusted in the narrow slots between the locking beams. The divergent side wall configuration for the slots ensures that this rigid debris will not prevent the flexed beams from returning to their unflexed, radially-inward positions when the bolt is removed. This is an important feature that enables the lock nut to be subsequently reused with substantially the same locking qualities, yet without requiring a special cleaning of the slots.

The lock nut described briefly above has proven to function generally satisfactorily in most situations. However, it is believed that the beam flexing can sometimes exceed the beams' elastic limits, such that when the bolt is removed, the beams do not return fully to their original, radially-inward positions. Consequently, when the lock nut is again used to threadedly receive a bolt, especially a bolt having a slightly smaller diameter than the first bolt, the lock nut might not grip the bolt with the desired compressive force. Another drawback to the lock nut described above is that the divergence of the confronting side walls defining each of the narrow slots can reduce the size of each beam so much that it no longer has the desired strength. Failures can therefore sometimes occur at the base of each beam.

Another form of lock nut includes the same kind of rigid body as described above, but with a generally cylindrical sleeve projecting from one end of the body and having a threaded opening that is deformed into an oval shape. The oval's minor transverse dimension is slightly less than the diameter of the threaded opening in the rigid body, and the oval's major transverse dimension is slightly greater than that diameter. When a bolt is threaded into the lock nut, the narrow sides of the oval flex outwardly, to frictionally lock the bolt in place. Lock nuts of this kind, which are sometimes called shank nuts, are available from Kaynar Microdot and Bristol Industries.

Although this latter kind of lock nut functions generally satisfactorily in most situations, the flexing of the oval sleeve occurs principally only at the base of the sleeve and can exceed the sleeve's elastic limit. Consequently, when the lock nut is subsequently reused with another bolt, especially a bolt having a slightly smaller diameter than the first bolt, the lock nut might not grip the bolt with the desired compressive force.

It should, therefore, be appreciated that there is a need for an improved lock nut that can be used repeatedly to lock onto many different bolts without any significant reduction in gripping force. It should also be appreciated that there is a need for a lock nut of the kind that includes a plurality of locking beams where the nut functions well in the presence of rigid debris encrusted in the narrow slots between the beams, without unduly compromising beam strength The present invention fulfills these needs.

SUMMARY OF THE INVENTION

The present invention is embodied in a lock nut adapted for repeated use in locking onto a series of bolts, each time frictionally gripping the bolt with substantially the same compressive force. The lock nut includes a rigid body having a threaded bore for receiving the bolt, and locking means projecting from one end of the rigid body and having a threaded bore aligned with the threaded bore of the rigid body, for locking onto the bolt. The locking means includes a generally circular wall that defines the threaded bore, and the wall, when unstressed, deviates radially inwardly such that at least one transverse dimension of the threaded bore of the locking means is less than the diameter of the threaded bore of the rigid body. The thickness of the wall progressively diminishes with increasing distance from the rigid body. When the wall flexes radially outwardly to accommodate the bolt threaded into the lock nut, to frictionally lock the bolt in place, the wall flexing therefore occurs at multiple locations along its axial extent. Consequently, the wall undergoes substantially only elastic deformation, whereby the lock nut grips each of the successive bolts with a uniformly high compressive force.

The generally circular wall of the locking means is defined by a plurality of beams projecting generally axially from one end of the rigid body. The beams are separated from each other by axial slots, and each beam is urged radially outwardly when the lock nut threadedly receives a bolt. Each of the beams has a radial thickness that diminishes in discrete steps, from its base end adjacent the rigid body to its remote end. A substantial proportion of the flexing of each beam occurs at each point where the beam's radial thickness steps downwardly.

In an independent feature of the invention, usable in the lock nut embodiment that includes a plurality of locking beams, the axial slots between adjacent beams are defined by beam side walls that diverge from each other with increasing radial distance, where the proportion of the side wall that diverges increases from a minimum at the base ends of the beams to a maximum at the remote ends of the beams Any rigid debris encrusted in the slots therefore will not inhibit a resilient return of the beams to their unflexed locations when the bolt is removed from the lock nut.

The base end of each beam flexes radially by the least amount, so the diverging portion of the side wall at that base end can be small. The remote end of each beam, on the other hand, flexes radially by the most amount, so the diverging portion of the side wall at that remote end should be relatively large. The divergence angle is preferably selected to be high enough that the diverging portion of each side wall is at least parallel with the beam's radial deflection axis. This beam configuration, which can be used with or without the stepped wall thickness feature discussed above, provides each beam with adequate strength to provide the desired level of resistance to flexing.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 6 is a side view of the locking beam nut of FIG. 1, with the nut threadedly receiving a bolt such that the locking beams are flexed to their radially-outward positions.

FIG. 7 is an enlarged fragmentary side view of the slot between adjacent locking beams, showing the beams in their flexed, radially-outward positions.

FIGS. 7A, 7B and 7C are enlarged, fragmentary cross-sectional views of the axial slot of FIG. 7, at the three locations indicated by the arrows A—A, B—B and C—C in FIG. 7, with the beams' flexed, radially-outward positions being shown in solid lines and unflexed, radially-inward positions being shown dotted lines.

FIG. 8 is a perspective view of a second preferred embodiment of a lock nut in accordance with the invention, this lock nut including an unslotted sleeve having a stepped thickness similar to the stepped thickness of the locking beams of the first embodiment FIG. 9 is a top plan view of the lock nut of FIG. 8.

FIG. 10 is a sectional view of the lock nut of FIGS. 8 and 9, taken substantially in the direction of the arrows 10—10 in FIG. 9, showing the unslotted sleeve's stepped thickness.

DESCRIPTION OF THE PREFERRED EMBODIMENTS

Figure 2:
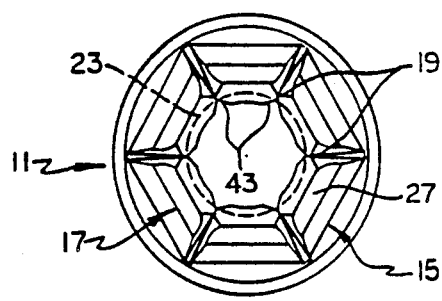
FIG. 2 is a top plan view of the locking beam nut of FIG. 1.

With reference now to the drawings, and particularly to FIGS. 1-6, there is shown a locking beam nut 11 adapted to threadedly receive a bolt 13 and frictionally grip the bolt with a compressive force so as to secure the nut in place. The nut is in one piece and includes a rigid body 15 and a plurality (e.g., six) of flexible locking beams 17 projecting from one end of the rigid body. The beams are separated from each other by narrow, axially-oriented slots 19.

Figure 3:
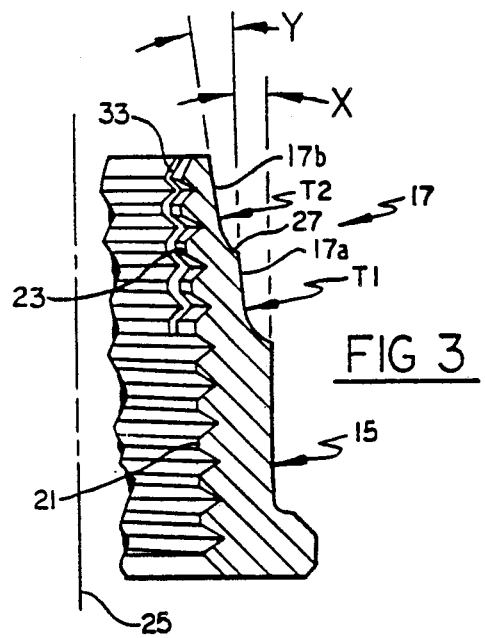
FIG. 3 is an enlarged sectional view of one locking beam from the locking beam nut of FIG. 1, taken substantially in the direction of the arrows 3—3 in FIG. 1, the beam being depicted in its unflexed, radially-inward position.
Figure 1:
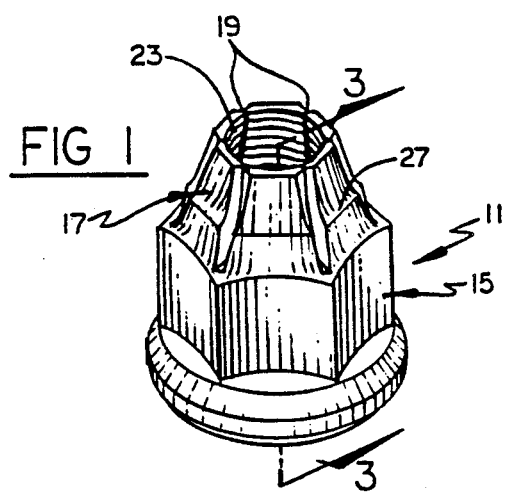
FIG. 1 is a perspective view of a locking beam nut in accordance with one preferred embodiment of the invention.
Figure 4:
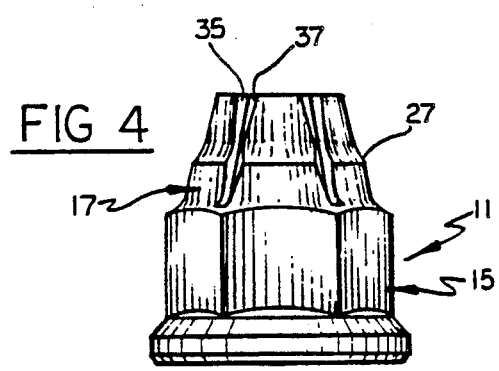
FIG. 4 is a side view of the locking beam nut of FIG. 1, with the locking beams positioned in their unflexed, radially-inward positions.
Figure 5:
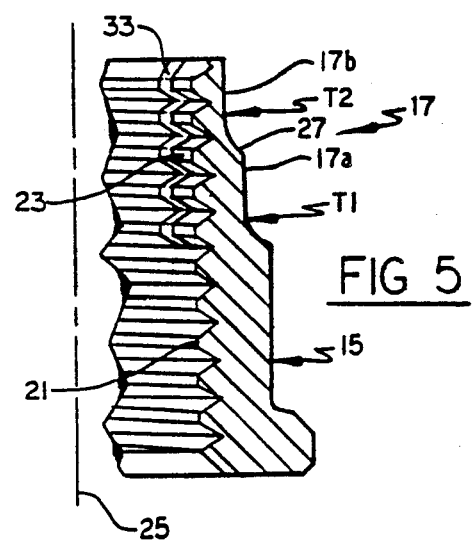
FIG. 5 is an enlarged sectional view similar to FIG. 3, but showing the locking beam in its flexed, radially-outward position.

As shown in FIG. 3, the rigid body 15 includes a threaded bore 21, and the locking beams 17 cooperate to define a threaded bore 23 coaxial with the threaded bore of the rigid body. The beams deviate radially inwardly relative to the nut's longitudinal axis 25 such that the threaded bore they define has a diameter that is progressively smaller than the diameter of the threaded bore in the rigid body. When the bolt 13 is threaded into the locking beam nut 11, the locking beams flex radially outwardly to accommodate the bolt, as shown in FIGS. 5 and 6. The resisting force causes the beams to frictionally engage the threads of the bolt, to secure the bolt within the nut and prevent vibration and the like from loosening the nut. When the bolt is subsequently removed from the nut, the beams flex radially inwardly back to their unflexed positions (FIGS. 3 and 4).

The locking beams 17 are made to flex at multiple locations along their lengths by configuring the beams to each have a radial thickness that steps downwardly with increasing distance from the rigid body 15. As best shown in FIGS. 3 and 5, each beam has a first uniform thickness T1 at a lower section 17a and a second, smaller uniform thickness T2 at an upper section 17b. A ledge 27 is thereby defined between the two sections.

When the bolt 13 is threaded into the nut 11, and the locking beams 17 flex radially outwardly to accommodate it, a substantial portion of the flexing of each beam occurs at the base or lower end of its lower section 17a and at the base or lower end of its upper section 17b. Flexing at multiple locations along the beam's length, in this fashion, enables a greater amount of total flex to be achieved without plastic deformation. Consequently, the nut will grip the bolt with a greater frictional force than could be achieved in the past with conventional beams having a more uniform thickness along their lengths. Flexing occurs in each beam section. Although only two such sections are depicted in this embodiment, it will be appreciated that a different plurality of sections could also be used.

With reference to FIG. 3, it will be observed that the outer surface of the lower section 17a of each locking beam 17 makes an angle X with the nut's longitudinal axis 25 and that the outer surface of the beam's upper section 17b makes an angle Y with the outer surface of the lower section 17a. In the depicted embodiment, the angles X and Y are substantially equal to each other, although it will be appreciated that this need not be the case. After the beam flexes radially outwardly to the position depicted in FIG. 5, the angles X and Y are both reduced substantially.

In a second embodiment of the invention, depicted in FIGS. 8-10, the plurality of locking beams 17 are replaced by a sleeve 29 that has been deformed into a slightly oval configuration. A threaded bore 31 defined by the interior surface of the sleeve has a minor dimension slightly less than the diameter of the threaded bore 21 in the rigid body 15. When a bolt (not shown) is threaded into the lock nut, the sleeve is urged into a more circular shape, with its resistance to this flexing providing the frictional force that locks the bolt in place. As with the first embodiment described above, the radial wall thickness of the sleeve steps downwardly with increasing distance from the rigid body. Consequently, the flexing of the wall occurs at multiple locations along the sleeve's length such that an increased total amount of elastic flexing can be achieved. This provides an improved, uniform locking on the bolt, even after multiple repeated uses.

With reference again to the lock nut of FIGS. 1-6, and in accordance with a separate feature of the invention, independent of the stepped wall thickness feature discussed above, the axial slots 19 that separate the locking beams 17 from each other are configured to provide each beam with a relatively high strength, while at the same time ensuring that any rigid debris encrusted in the slot will not prevent the beams from returning to their unflexed, radially-inward positions (FIGS. 3 and 4) when the bolt 13 is removed. This slot configuration is depicted in detail in FIGS. 7 and 7A-7C. It will be noted that the slot is defined by confronting beam side walls 35 and 37 that include parallel portions 35a and 37a and diverging portions 35b and 37b. The diverging portions are located radially outwardly of the parallel portions, and the relative size of the diverging portions increases from a minimum at the base or lower ends of the beams, adjacent to the nut's rigid body 15, to a maximum at the remote or upper ends of the beams.

When the bolt 13 has been threaded into the locking beam nut 11, the locking beams 17 flex radially outwardly, with the amount of flexing being a maximum at the remote tip of each beam and diminishing to zero at the base of each beam. FIGS. 7A-7C depict this flexing at the beams' remote tips, midpoints, and bases, respectively. It will be noted that at the beams' remote tips (FIG. 7A) the diverging portions 35b and 37b of the beam side walls 35 and 37, respectively, have a maximum size and are oriented substantially parallel with the respective radial deflection axes 39 and 41, respectively. Thus, any rigid debris located in this portion of the slot 19 will not prevent the resilient return of the beams from their flexed, radially outward positions (solid lines) to their unflexed, radially-inward positions (dotted lines), because the beams will simply slide along the debris. When six locking beams are provided, this angle of divergence is about 60 degrees.

At the midpoints of the beams (FIG. 7B) the parallel portions 35a and 37a of the beam side walls are about the same size as the diverging portions 35b and 37b, and the radial distance between the flexed, radially-outward position (solid lines) and unflexed, radially-inward position (dotted lines) is about half that for the remote ends (FIG. 7A). Again, any rigid debris encrusted in this portion of the slot will not prevent a resilient return of the beams to their radially-inward positions when the bolt 13 is removed.

Finally, at the bases of the beams 17 (FIG. 7C), the parallel portions 35a and 37a make up the entire beam side walls. No radial flexing at all occurs in this portion of the beams, and the presence of any rigid debris in this portion of the slot 19 will be of no consequence.

The configuration for the axial slots 19 thus enables the locking beam nut 11 to function effectively in the presence of rigid debris encrusted in the slots, yet at the same time does not rob the beams of material considered important in providing the desired degree of strength. Resistance to flexing, and thus the frictional gripping force on the bolt 13, can therefore be maximized.

As shown most clearly in FIG. 2, the threaded bore 23 defined by the locking beams 17 includes axial or longitudinal recesses 43 in the regions of the slots 19. These recesses have depths roughly equal to the depth of the threads, so as to space the edges of each beam from the threads of the bolt 13. Further spacing the beam edges away from the bolt is the sizing of the beams' pitch radius to be slightly greater than (e.g., 0.002 inches) the bolt's pitch radius. The beam and bolt threads therefore are tangent with each other only at the midpoint of each beam. The recesses and the pitch radius difference combine to eliminate the need to separately remove any burrs formed during the creation of the slots. This also minimizes the possibility of galling the threads.

It should be appreciated from the foregoing description that the present invention provides an improved lock nut adapted for repeated use in locking onto a series of bolts, each time compressively gripping the bolt with substantially the same high compressive force. This result is achieved by a resilient locking means that flexes at multiple locations along its length, whereby the total amount of elastic flexing can be maximized. In a separate feature of the invention, the longitudinal slots separating adjacent locking beams are configured to enable repeated use of the lock nut despite the presence of rigid debris encrusted in the slots, while at the same time maximizing the strength of each beam in resisting the flexing and providing a maximum compressive gripping force on the bolt. In yet another feature of the invention, the lock nut's threaded bore is longitudinally recessed in the region of each slot, to space the edges of each beam from the bolt and thereby prevent galling of the threads.

Although the invention has been described in detail with reference only to presently preferred embodiments, those of ordinary skill in the art will appreciate that various modifications can be made without departing from the invention Accordingly, the invention is defined only by the following claims.

We claim:

1. A locking beam nut adapted to receive a bolt, comprising:
    a rigid body having a circular opening extending through it; and
    a plurality of resilient, circumferentially-spaced locking beams projecting from one end of the rigid body and having inner surfaces that define a circular opening aligned with the circular opening in the rigid body, the locking beams all deviating radially inwardly such that the circular opening they define has a uniformly-decreasing diameter;
    wherein the circular openings defined by the rigid body and the plurality of locking beams contain threads along their entire axial length for receiving a bolt, the locking beams resiliently flexing radially outwardly to lock the bolt in place;
    wherein the plurality of locking beams each have side walls arranged in spaced, confronting relationship with the side walls of circumferentially-adjacent locking beams;
    and wherein the plurality of locking beams are configured such that substantial portions of the confronting side walls of adjacent beams diverge from each other, with increasing radial distance, with the amount of the diverging portions increasing from a minimum at the base ends of the beams, adjacent to the rigid body, to a maximum at the remote ends of the beams, such that any debris located in the space between the side walls does not inhibit a resilient return of the beams to their unflexed, radially-inward locations when the bolt is removed from the locking beam nut.

2. A locking beam nut as defined in claim 1, wherein:

the plurality of beams each have a radial thickness that diminishes progressively with increasing distance from the rigid body; and the radially-outward flexing of the beams to accommodate the bolt occurs at multiple locations along the axial extents of the beams.

3. A locking beam nut as defined in claim 2, wherein:

each of the plurality of beams has a radial thickness that diminishes in discrete steps, from its base end adjacent to the rigid body to its remote end; and a substantial proportion of the flexing of each beam that occurs when a bolt is threaded into the locking beam nut occurs at each point where the beam's radial thickness steps downwardly.

4. A locking beam nut as defined in claim 1, wherein the angle of divergence between the diverging portions of the confronting side walls of adjacent beams is selected to be sufficiently high such that that portion of each side wall is at least substantially parallel with the direction of the beam's radial flexing.

5. A locking beam nut as defined in claim 1, wherein the threaded bore of the plurality of locking beams includes a longitudinally-aligned recess surrounding each longitudinal slot, the recess being sized to space the beam edges defined by each slot from the threads of the bolt threaded into the locking beam nut.

6. A locking beam nut adapted to receive a bolt, comprising:

a rigid body having a threaded bore for threadedly receiving a bolt; and a plurality of locking beams projecting axially from one end of the rigid body and defining a threaded bore coaxial with the threaded bore of the rigid body, wherein each beam, when unstressed, deviates radially inwardly, such that the diameter of the threaded bore they define is less than the diameter of the threaded bore of the rigid body;

wherein each of the plurality of beams has a radial thickness that diminishes in discrete steps, from its base end adjacent to the rigid body to its remote end;

wherein the the locking beams flex radially outwardly to accommodate the bolt threaded into the coaxial threaded bores of the rigid body and the locking beams and thereby frictionally lock the bolt in place;

wherein a substantial proportion of the flexing of each beam that occurs when a bolt is threaded into the locking beam nut occurs at each point where the beam's radial thickness steps downwardly;

wherein the threaded bore of the plurality of locking beams includes a longitudinally aligned recess surrounding the site of each longitudinal slot, the recess being sized to space the beam edges defined by each slot from the threads of the bolt threaded into the lock nut;

wherein the plurality of locking beams each have side walls arranged in spaced, confronting relationship with the side walls of circumferentially-adjacent locking beams;

and wherein the plurality of locking beams are configured such that substantial portions of the confronting side walls of adjacent beams diverge from each other, with increasing radial distance, with the amount of the diverging portions increasing uniformly from substantially zero at the base ends of the beams, adjacent to the rigid body, to a maximum at the remote ends of the beams, the divergence angle being selected to be sufficiently high that that portion of each side wall is at least substantially parallel with the direction of the beam's radial flexing, whereby any debris located in the slots between the side walls does not inhibit a resilient return of the beams to their unflexed, radially-inward locations when the bolt is removed from the locking beam nut.

* * * * *